No. 826,144. PATENTED JULY 17, 1906.
J. C. COLE.
TIRE FASTENING DEVICE.
APPLICATION FILED OCT. 26, 1905.

Witnesses:
H. L. Sprague
E. H. Scaholm

Inventor:
John C. Cole
Chapin & Co.
by
Attorneys

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION.

TIRE-FASTENING DEVICE.

No. 826,144.     Specification of Letters Patent.     Patented July 17, 1906.

Application filed October 26, 1905. Serial No. 284,436.

*To all whom it may concern:*

Be it known that I, JOHN CLARENCE COLE, a citizen of the United States of America, residing at Chicopee Falls, in the county of Hampden and State of Massachusetts, have invented new and useful Improvements in Tire-Fastening Devices, of which the following is a specification.

This invention relates to pneumatic tires for vehicles; and the object thereof is to provide an improved mechanical fastening device for pneumatic tires of that type in which the base of the tire-casing is clamped to the rim of the wheel by the clamping devices and the two sides of the circumferentially-divided base at the same time clamped together in a direction transversely of the rim to constitute a practically tight casing and to provide a smooth interior surface of the casing for the inner tube to rest upon, the essential feature of the invention residing in the mechanism whereby this clamping action in the direction of the plane of the wheel to secure the tire to said rim and the lateral clamping action to press the two parts of the circumferentially-divided base may be effected at one operation, the construction of the rim being such that when the fastening devices are released the tire may be applied to or removed from the rim from one side thereof, which is left unobstructed by the removal of parts of the fastening devices.

Having these ends in view, the invention consists in providing a substantially flat rim having an abutment on one edge thereof for one side of the base of the casing and in providing a flanged ring for the opposite side of the base to fit over the upper edge of the base and against the outer edge of the base, a contractible ring being fitted to the rim outside of the flanged ring to bear against the latter and against an inclined lip on the rim, to the end that the contraction of the ring may force the flanged ring laterally over the inclined surface of the flanged base of the tire and simultaneously force the latter against the opposite part of the base and also downwardly against the rim of the wheel.

The invention is illustrated in the accompanying drawings, in which—

Figure 1:
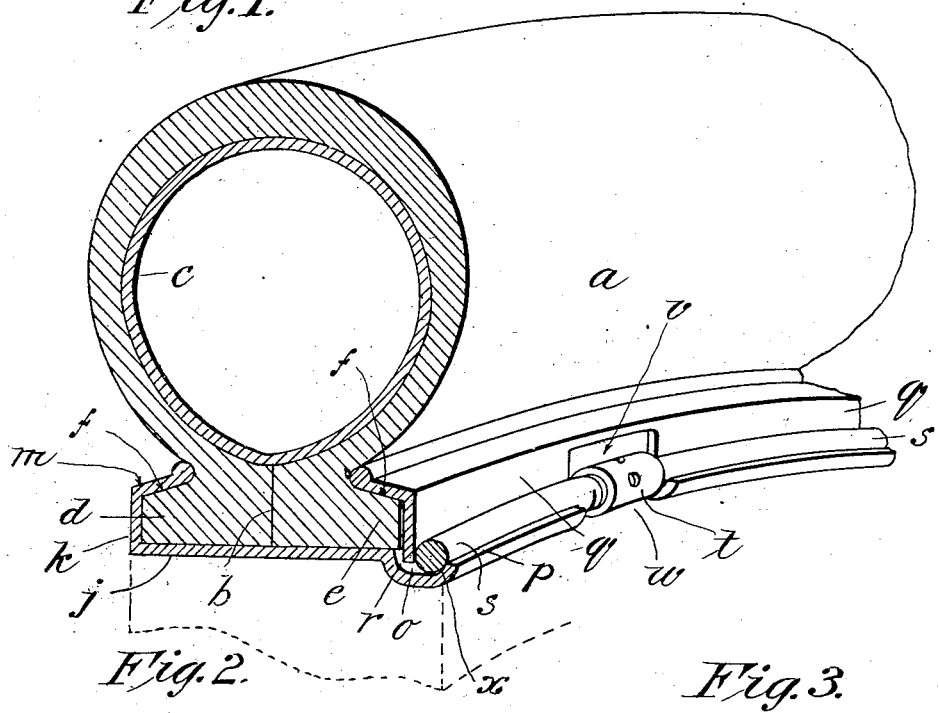
Figure 2:
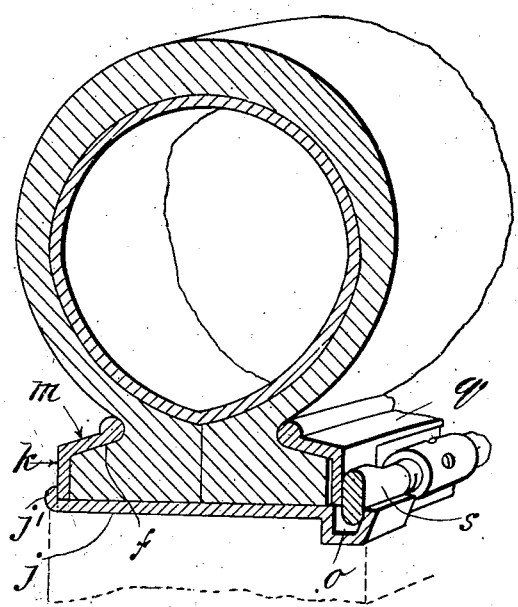
Figure 3:
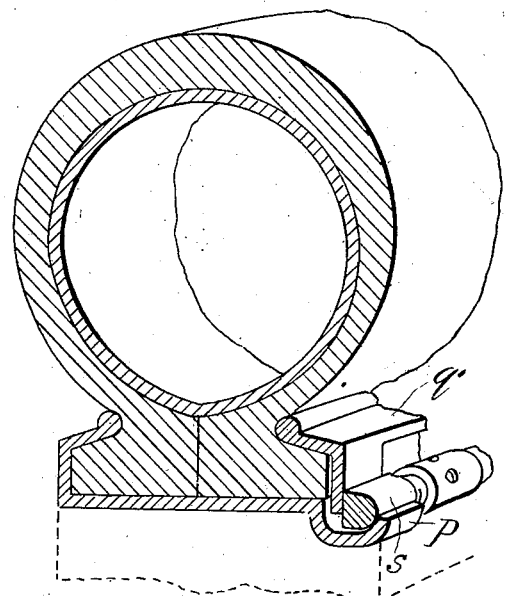

Figure 1 is a perspective view of a portion of a tire and the rim of a vehicle and fastening devices embodying this invention. Fig. 2 is a like view showing certain modifications in the construction of the rim. Fig. 3 is similar to the other views, showing certain modifications in the construction of a part of the fastening devices.

Referring to the drawings, *a* indicates the outer casing of a tire which is circumferentially divided at the line *b*, extending from the under side of the base to the interior of the casing, the latter opening along this line to permit the insertion or removal of the inner tube *c*. This form of tire is well known; but in order to produce the best results or in order to obtain successful results it is essential that the two flanged parts of the base of the tire (indicated in the drawings by *d* and *e*) lying, respectively, on either side of the dividing-line *b* should, when the tire is fastened to the rim of a wheel, be forced tightly together not only to close any opening on the line of division, but also to constitute a laterally solid base and prevent any working of the parts at that point or any movement away from the fastening devices. The two flanged portions of the base referred to are provided with outwardly and downwardly extending upper surfaces *f*.

This tire and base are the same as those shown in United States Letters Patent issued to me on March 25, 1902, numbered 696,391, in which means are shown whereby the two flanged parts *d* and *e* of the base may be simultaneously forced together in a direction transverse to the rim and forced toward the rim substantially in the plane of the wheel; but these devices are of such a nature as to require their individual actuation to release the tire from the wheel and comprise among other things bolts with nuts thereon. These after long exposure to the weather and after becoming encrusted with dirt are not always easily manipulated, and it is to overcome the objections to the particular form of fastening devices shown in my said patent that the present invention has been devised.

In this invention the rim *j* (preferably flat) is provided with an abutment *k* on one side thereof having one vertical portion to bear against the side of the base and another inclined portion, as *m*, to extend over the inclined surface *f* of the base of the tire to lock one edge of the base to the rim. This abutment may be made integral with the rim, as shown in Fig. 1, or it may be made separately therefrom, as shown in Fig. 2, in which case the rim would be provided with an upturned edge or rib $j'$, against which the vertical portion or wall of the annular abutment would get a bearing. On the opposite border of the rim a channel $o$ is rolled, which is curved in cross-section or made in such other form that the outer edge thereof (indicated by $p$) may be somewhat outwardly inclined relative to the periphery of the rim.

Fitting over that edge of the flanged base of the wheel opposite to that which bears on the abutment $k$ is an endless ring $q$, which in cross-section is preferably like unto the abutment $k$, and the diameter of said ring, measured from the inner edges thereof, (indicated by $r$,) is such as to permit it to be passed over the outer border of the rim and come to a bearing, as shown in the various drawings, against the upper inclined surface $f$ of the base without coming in contact with the vertical edge of the rim—that is to say, there must always be space enough to permit this ring $q$ to move laterally toward the abutment $k$, whereby the two parts of the base may be forced together and whereby by forcing the upper inclined portion of said ring upwardly over the downwardly-inclined portion $f$ of the base the latter may be at the same time forced toward the rim. The vertical part of the ring $q$ may eventually contact with the vertical edge of the base; but the main function of the vertical part of the ring is to provide a bearing for the contractible ring $s$, whereby the latter may be kept down to small diameter. This crowding of the ring $q$ laterally of the rim of the wheel is effected by locating the expansible and contractible ring $s$ between the upturned lip $p$ of the groove in the rim and the vertically-disposed side of the ring which is adjacent to the edge of the base and when so located contracting said ring. This, preferably, is accomplished by uniting the two ends of a ring in a turnbuckle $t$, the opposite ends of the ring being provided with right and left hand threads in the usual manner.

To accommodate the turnbuckle, the vertical side of the ring $q$ is cut away, as at $v$, and at $w$ the lip $p$ of the rim is cut away, and by this means ample room is provided for the rotation of the turnbuckle. As the latter is rotated and the ring $s$ begins to contract it is forced by means of the inclined surface against which it bears, as at $x$, against the vertical side of the ring $q$, moving the latter bodily transversely of the rim of the wheel and crowding the ring upwardly over the inclined surface $f$ of the base of the wheel, thereby accomplishing both of the objects sought to be obtained and which are attained in my said prior construction by means of a multiplicity of transversely-located bolts and a loose ring fitting over the inclined surface of the base against which the bolts bear.

My present invention is much simpler in that but one operation is necessary to loosen the ring $s$, whereby it may be expanded sufficiently to remove it from the channel $o$ in the rim and permit the removal of the ring $q$, whereupon the tire may be drawn off of the rim in the same manner that the ring $q$ was removed.

It is entirely immaterial what form the channel $o$ may take, provided the coöperative action of it and the ring $s$ may serve to move the clamping-ring $q$ laterally across the rim of the wheel for the purpose described.

In Fig. 2 a substantially rectangular form is shown having an inclined outer edge like the lip $p$, though the channel in this case is both deeper and narrower, being made particularly to adapt it to the use of the ring $s$, which is transversely flattened to give it an oblong shape in cross-section. This permits the narrowing of the rim somewhat and gives a broader bearing on the vertical side of the ring $q$ for the ring $s$. When this construction embodying the narrow channel $o$ is used, it necessitates the making of the ring $q$ of such diameter as will permit it to slide over the face of the rim rather than as shown in Fig. 1, in which the vertical side of the ring $q$ extends into a space between the edge of the rim and the contractible ring $s$.

In the construction shown in Fig. 3 the ring $s$ is a sort of combination of that shown in Fig. 1 and that in Fig. 2—namely, it has a rounded outer edge to bear against the lip $p$ on the rim made in substantially the same manner as shown in Fig. 1, but it has also the flat side of the ring $s$ (shown in Fig. 2) to bear against the vertical side of the ring $q$. Any one of these forms is an efficient one.

I am aware that it is not new to use a contractible ring to secure a tire to the rim of a wheel, and, broadly, I do not claim this; but I believe it to be new to construct tire-fastening devices in which the contractible ring serves not only to secure the base of the tire to the rim of the wheel in the plane of the latter, but also to clamp the two parts of a longitudinally-divided base together transversely of the rim by the same operation.

By the use of the terms "up" and "down" and their derivations in the specification and claims I mean from and toward the axis of the wheel.

Having thus described my invention, what I claim, and desire to secure by Letters Patent of the United States, is—

1. A tire construction comprising a rim having an abutment on one side thereof for the base of the tire, there being a circumferentially-disposed channel in said rim in the opposite side thereof; a tire-casing having a flanged base seated on the rim against said abutment, the upper surface of said flanged base being downwardly and outwardly beveled; a ring of greater diameter than the rim to fit over said base on the beveled portion thereof, and a contractible ring located in, and bearing against the outer border of said channel and against said ring on the base of the tire, means to contract said ring, said ring during its contraction being movable inwardly and downwardly relative to the rim.

2. In a tire construction, a rim having an abutment at one side and a circumferentially-disposed channel at the opposite side, a divided flanged tire-casing the base of which projects beyond the inner edge of the channel, a ring fitted over the flanged base and depending into the channel, contractile means engaging the ring and the inclined edge of the channel and the rim whereby the divided flanged base of the tire-casing is forced together and the ring prevented from engaging the inner edge of the channel, as described.

3. In a tire construction, a rim having an abutment at one side and a channel at the other, a tire-casing wider than the outer surface of the rim, a ring engaging the tire-casing and having a flange extending into the channel and below the outer surface of the rim, a contractile ring engaging the channel and ring, whereby the tire-casing may be clamped to the rim.

4. A tire construction comprising a rim substantially L-shaped in cross-section including an abutment at one side, a channel at the other side, a tire-casing engaging the rim and overhanging the channel, a ring having a flange for engaging the tire-casing, and contractile means securing the tire-casing to the rim and located in the channel, whereby the abutment and ring are forced against the said casing in opposite directions.

JOHN CLARENCE COLE.

Witnesses:
K. I. CLEMONS,
H. A. CHAPIN.